Nov. 30, 1926.
A. RICHMOND ET AL
1,609,201
GRIDDLE
Filed July 7, 1925
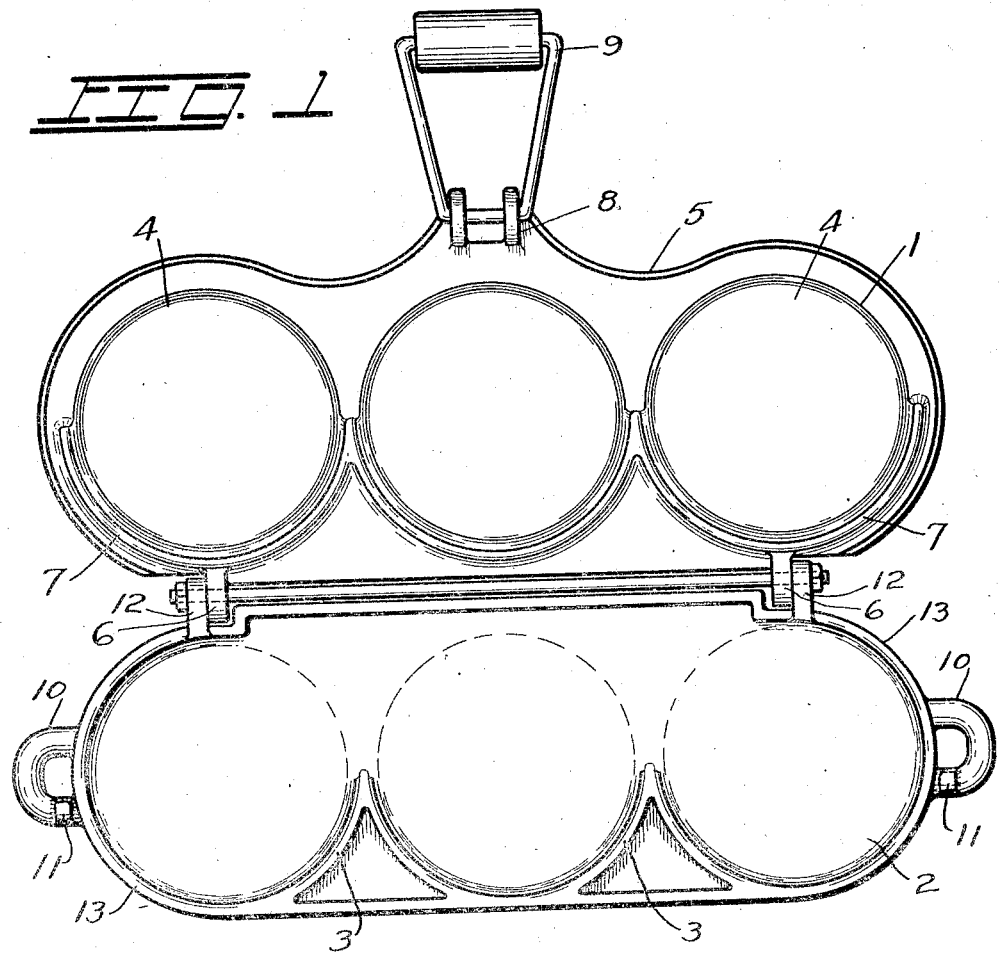
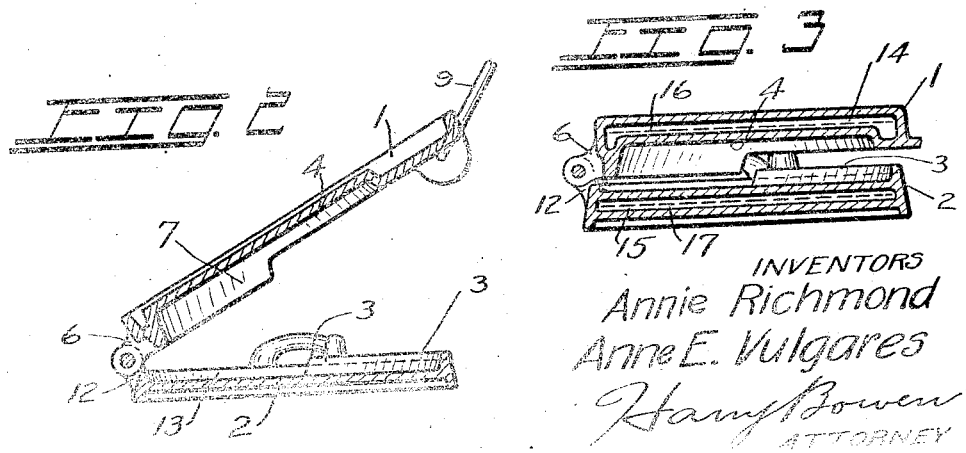
INVENTORS
Annie Richmond
Anne E. Vulgares
Harry Bowen
ATTORNEY Patented Nov. 30, 1926.

1,609,201

UNITED STATES PATENT OFFICE.

ANNIE RICHMOND AND ANNE E. VULGARES, OF SEATTLE, WASHINGTON.

GRIDDLE.

Application filed July 7, 1925. Serial No. 41,949.

The invention is an iron for hot cakes or the like which is provided with a baffle at the outer edge to hold the cakes and stop the spatter of the grease.

The object of the invention is to provide a means for preventing the spatter of grease from a hot cake iron as the cakes are dumped from one side to the other.

Another object of the invention is to provide an iron for hot cakes or the like which has means for holding the cakes in shape as they are being cooked on their reverse sides.

And a further object of the invention is to provide a hot cake iron having a ridge at the outer edge of the second grid which is of a simple and economical construction.

With these ends in view, the invention embodies the placing of a baffle ridge at the outer edge of the second grid of a hot cake iron and the shaping of the said ridge so that it will conform to the shape of the outer edges of the cakes.

Other features and advantages of the invention will appear from the following description, taken in connection with the drawings, wherein:—

Figure 1 is a plan view of the iron in the open position.

Figure 2 is a cross section through the center of the iron showing it partly closed.

Figure 3 is a similar section showing the iron closed and also showing electric elements in compartments in the sections.

In the drawings we have shown our device as it would be made wherein numeral 1 indicates the section in which the batter is first placed, numeral 2 the section upon which the batter is dumped from the first section and numeral 3 the baffle ridge at the outer edge of the second section.

The section 1 is made with a plurality of shallow circular pans 4 made in a frame 5 which is hinged to the section 2 through lugs 6. The inner edges of the pans 4 are provided with baffle ridges 7 as shown in Figures 1 and 2 and the outer edge of the frame 5 is provided with lugs 8 in which a handle 9 may be pivotally held.

The second section 2 is provided with handles 10 having lugs 11 on them upon which the upper or first sections will rest as it is turned over to dump the cake. Lugs 12 may be placed at the inner edge of the section 2 to which the section 1 may be hinged. The body of the section 2 is in the form of a flat plate with a ridge 13 extending continuously around the outer edge and the special baffle ridge 3 extending upward from the plate as shown to form a guard at the outer edge. It will be observed that this ridge is curved to correspond with the peripheries of the outer halves of the pans 4 so that as the cakes are dumped from the first section to the second section, their outer edges will engage the inner surface of the baffle 3 and they will therefore be held in perfect shape.

In the design shown in Figure 3, the sections 1 and 2 are provided with compartments 14 and 15 in which electric heating elements 16 and 17 may be placed to heat the iron. It will be observed that these compartments 14 and 15 or the sections 16 and 17 may be of any suitable design and may be arranged in any suitable manner.

It will be understood that other changes may be made in the construction without departing from the spirit of the invention. One of which changes may be in the use of an iron with any number of pans instead of the three as shown, another may be in the shape of the pans as it is understood they may be of any suitable shape instead of being circular as shown, and still another may be in the changing of the exact design of the baffle ridge 3.

The construction will be readily understood from the foregoing description. To use the device, it may be made as shown and it will be observed that the batter is first placed on section 1 and as it is cooked on one side, the section 1 may be raised and turned over to the position shown in Figure 2 so that the cakes will drop upon the section 2 and as they drop upon this section, their outer edges will engage the baffle 3 which will hold the cakes in perfect shape and at the same time obstruct the path of the spatter of grease so that it will be held upon the plate. It will therefore be observed that the particular baffle ridge 3 is a decided improvement in irons of this type and that it performs a two fold purpose in that it holds the cakes in perfect shape and prevents the spattering of the grease.

Having thus fully described the inven- tion, what we claim as new and desire to secure by Letters Patent, is:—

An improvement in cake griddles comprising two flat plates hinged together, one of the said plates having a handle at one side, circular recesses in the inner surface thereof and semi-circular ridges at the inner side of the said circular openings, and corresponding semi-circular ridges on the other of the said plates positioned to complete the circles of the ridges on the said former plate when the two plates are together.

ANNIE RICHMOND.
ANNE E. VULGARES.